(12) United States Patent
Gan

(10) Patent No.: US 6,392,874 B1
(45) Date of Patent: May 21, 2002

(54) COMPUTER CASING WITH INTERNAL FASTENER

(75) Inventor: Li Yuan Gan, ShenZhen (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/715,675

(22) Filed: Nov. 17, 2000

(30) Foreign Application Priority Data

Aug. 16, 2000 (TW) .................................. 089214217 U

(51) Int. Cl.[7] ................................................ G06F 1/16
(52) U.S. Cl. ........................ 361/683; 361/724; 292/148; 364/708.1
(58) Field of Search ................................ 361/683–686, 361/724–727, 740, 759; 292/42, 148, 151, 307 R; 70/57–58, 85; 364/708.1; 312/223.1–223.3

(56) References Cited

U.S. PATENT DOCUMENTS 5,931,550 A * 8/1999 Chen .......................... 312/244
6,015,195 A * 1/2000 Anderson et al. ........... 361/683
6,304,438 B1 * 10/2001 Liu et al. ..................... 361/685

* cited by examiner

Primary Examiner—Leo P. Picard
Assistant Examiner—Hung Van Duong
(74) Attorney, Agent, or Firm—Wei Te Chung

(57) ABSTRACT

A computer casing includes a cage (10), a fastener (109), and first and second side panels (20, 30). The cage includes a top panel (100). The fastener is mounted to a bottom surface of the top panel, and includes a body (112), an elastically deformable resilient plate (114), a slider (116), and a spring (118). A top end of the second side panel engages with the fastener. The body forms a central channel (132) for receiving the slider. One end of the slider defines a slanted portion (162), for engaging with a wedge (140) of the resilient plate. The slider controls attachment of the second side panel, and is movable between a locking position and a releasing position. The spring connects the body with the slider. The slider is accessible only after removal of the first side panel, so the second side panel cannot be accidentally removed first.

20 Claims, 8 Drawing Sheets

COMPUTER CASING WITH INTERNAL FASTENER

BACKGROUND OF THE INVENTION

1. Field of the Invention

The present invention relates to a computer casing, and in particular to a computer casing having a fastener for readily securing a side panel to the casing and readily detaching the side panel from the casing.

2. The Related Art

In order to attach a mainboard to a computer casing, the computer casing is typically built with an opening. The opening is covered by a detachable side panel, which also provides shielding for the computer. A computer mainboard is conventionally passed through the opening and attached to an opposite side panel of the casing. These days, computer casings are being made smaller and smaller. It is therefore becoming more and more difficult to attach the mainboard to the opposite side panel, particularly because internal space is taken up by a drive bracket attached to a front panel of the computer casing. Moreover, the detachable side panel is often secured to the casing with bolts, which is a time-consuming and laborious task. A time-consuming task at a work site on an assembly line can lead to paralysis of the whole assembly line.

In an endeavor to overcome the above problems, another conventional computer casing defines two openings at respective opposite sides thereof. The openings are covered by two detachable side panels. A mainboard is mounted onto one of the side panels, and the side panel is then attached over one opening. The mainboard is connected to electronic devices inside the casing with leads. The other side panel is then attached over the other opening. However, this process requires screws, making it unduly cumbersome. Furthermore, a user may not know which of the side panels is connected to the mainboard. The side panel connected to the mainboard is easily detached by the user, frequently resulting in damage to the mainboard and electronic devices.

SUMMARY OF THE INVENTION

Accordingly, an object of the present invention is to provide a computer casing having a side panel with a mainboard attached thereto, whereby the side panel cannot be accidentally detached from the casing.

Another object of the present of invention is to provide a computer casing with easily detachable side panels.

To achieve the above-mentioned objects, a computer casing comprises a cage, a fastener, and first and second side panels. The cage comprises a top panel, a rear panel, a bottom panel, a front panel, and an opening defined at each side of the cage. The fastener is mounted to a bottom surface of the top panel, and includes a body, an elastically deformable resilient plate, a slider, and a spring. A bottom end of the second side panel is attached to a side of the bottom panel by a pair of pivoting sheets. A top end of the second side panel is secured to the cage by engaging with the fastener. The body of the fastener forms a central channel for receiving the slider therein. The slider controls attachment of the second side panel, and is movable between a locking position and a releasing position. One end of the slider forms a slanted portion, for engaging with a wedge of the resilient plate. The spring connects the body with the slider and retains the slider in the locking position. The first side panel is attached to one side of the cage opposite the second side panel. The slider is accessible only after removal of the first side panel, so the second side panel cannot be accidentally removed first.

Other objects, advantages and novel features of the present invention will be drawn from the following preferred embodiment with attached drawings, in which:

DESCRIPTION OF THE PREFERRED EMBODIMENT

Figure 1:
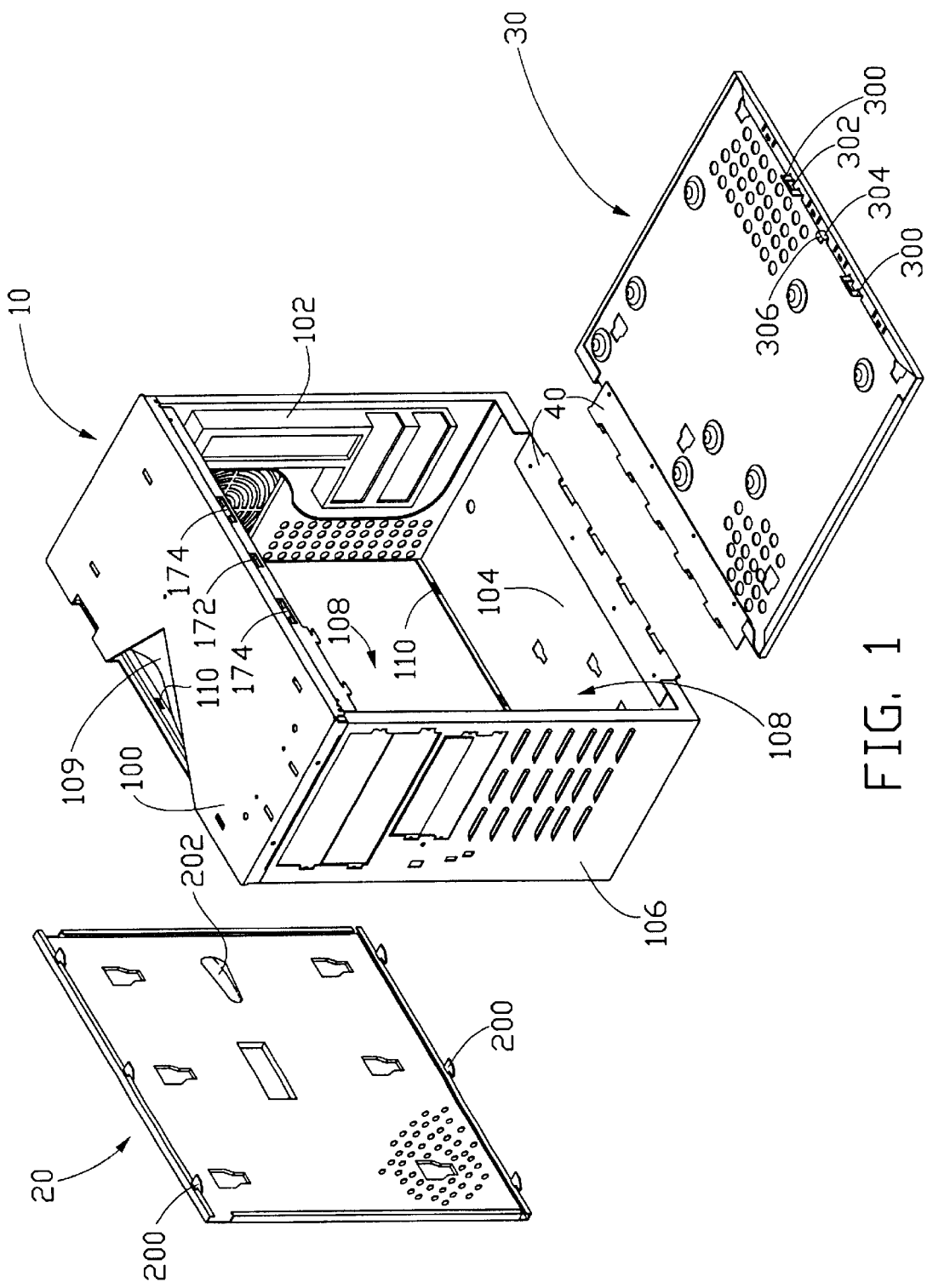
FIG. 1 is an exploded view of a computer casing in accordance with the present invention.

Referring to FIG. 1, a computer casing of the present invention includes a cage 10, a first side panel 20, a second side panel 30 and a pair of pivoting sheets 40. The cage comprises a top panel 100, a rear panel 102, a bottom panel 104, and a front panel 106. Each side wall of the cage 10 defines an opening 108 for respectively receiving the first and second side panels 20, 30. A fastener 109 (only partly visible) is attached to a bottom surface of the top panel 100.

One longitudinal side of the top panel 100 defines a plurality of notches 110, for engaging with the first side panel 20. An opposite longitudinal side of the top panel 100 defines a central rectangular orifice 172 and two rectangular holes 174 on opposite sides of the orifice 172, for engaging with the second side panel 20. One longitudinal side of the bottom panel 104 defines a plurality of notches 110, for engaging with the first side panel 20. An opposite longitudinal side of the bottom panel 102 is adapted to connect to one pivoting sheet 40. A plurality of internal clasps 200 is formed at upper and lower edges of the first side panel 20, for engaging with the notches 110 of the top panel 100 and bottom panel 104. An outer surface of the first side panel 20 defines a recess 202 therein, for users to grasp and move the first side panel 20. A central latch 304 extends perpendicularly inwardly from near an upper edge of the second side panel 30. A nub 306 extends perpendicularly from an innermost end of the latch 304 toward a bottom of the second side panel 30. Two catches 300 extend perpendicularly inwardly from near the upper edge of the second side panel 30 on either side of the latch 304, for engaging with the holes 174 of the top panel 100. Each catch 300 defines a rectangular slit 302 therein.

Figure 2:
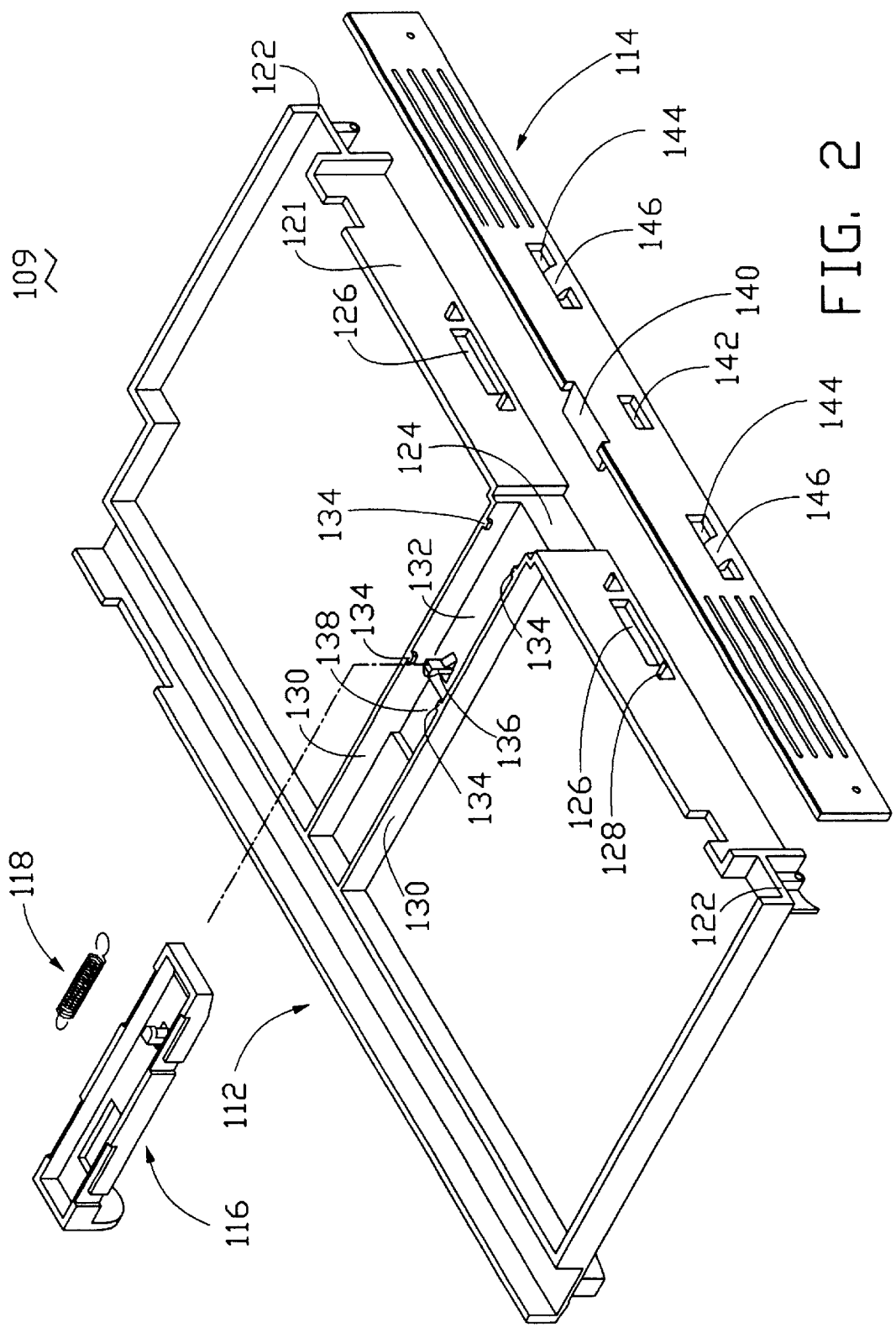
FIG. 2 is an exploded view of a fastener for a side panel of the computer casing, in accordance with the present invention.

Referring also to FIG. 2, the fastener 109 to be fixed at the bottom surface of the top panel 100 includes a body 112, a resilient plate 114, a slider 116 and a spring 118. A pair of extension portions 122 extends perpendicularly from one edge of the body 112 at respective opposite ends of the edge. An indentation 124 is defined in a center of one side wall 121, between the extension portions 122. A rectangular slot 126 is defined in the side wall 121 at each side of the indentation 124, corresponding to the holes 174 of the cage 10. A stop 128 extends outwardly from the side wall 121 near each side of each slot 126. A pair of parallel beams 130 is formed between the side wall 121 and the opposite side wall (not labeled) of the body 112. The beams 130 are at the center of the body 112, and are perpendicular to the side wall 121. The beams 130 form a channel 132 therebetween. The channel 132 is in communication with the indentation 124.

Each beam 130 forms two bosses 134 which oppose the bosses 134 of the other beam 130. A post 136 extends upwardly from the body 112 into a middle portion of the channel 132. A head (not labeled) extends perpendicularly from a top of the post 136, in a direction away from the side wall 121. Reinforcing ribs (not labeled) are formed between a base of the post 136 and the body 112. A cutout 138 is defined through the body 112 at the channel 132, between the post 136 and the side wall (not labeled) which is opposite to the side wall 121. The cutout 138 is in communication with the channel 132.

The resilient plate 114 is elastically deformable in vertical directions. A wedge 140 extends perpendicularly from one side of a middle portion of the resilient plate 114, for engagement with the indentation 124 of the body 112. A rectangular foramen 142 is defined in the resilient plate 114 beneath the wedge 140. Two rectangular apertures 144 are defined in the resilient plate 114 on respective opposite sides of the foramen 142, corresponding to the slots 126 of the body 112. An unciform tab 146 extends from the resilient plate 114 at a bottom extremity of each aperture 144, in the same direction as the wedge 140.

Figure 3:
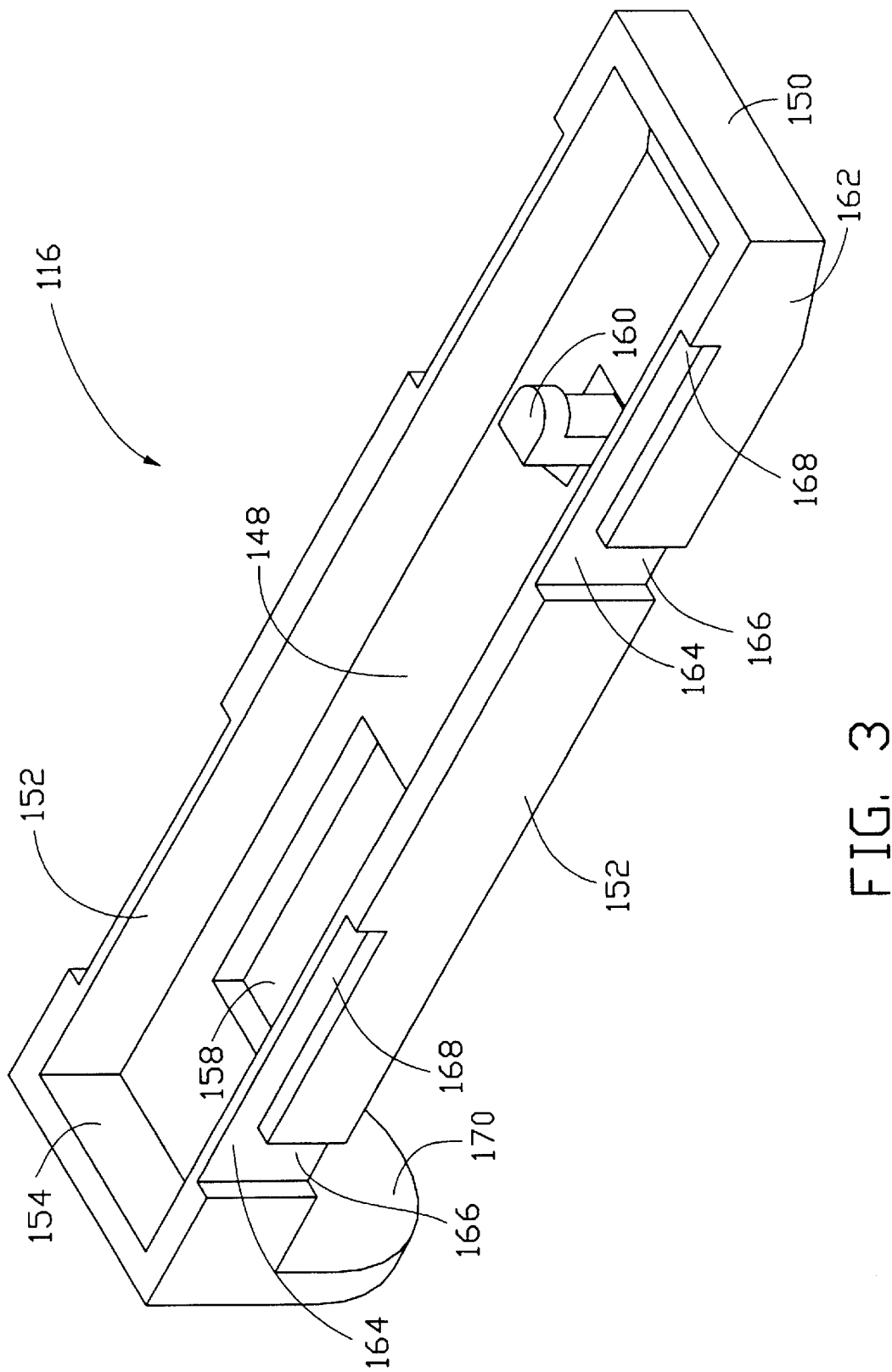
FIG. 3 is a perspective view of a slider of the computer casing, in accordance with the present invention.
Figure 4:
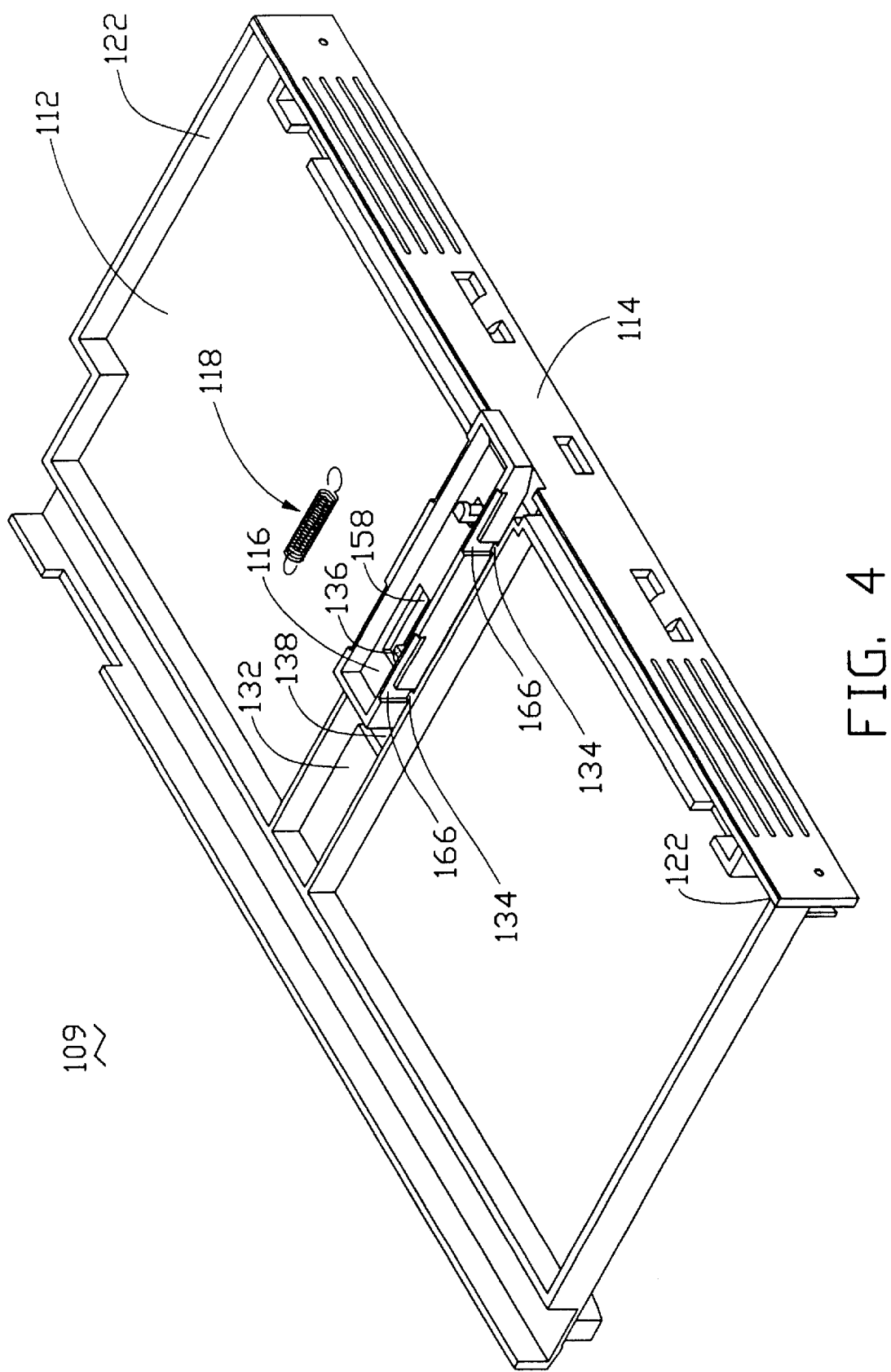
FIGS. 4–7 are perspective views of various sages of assembly of the fastener.
Figure 5:
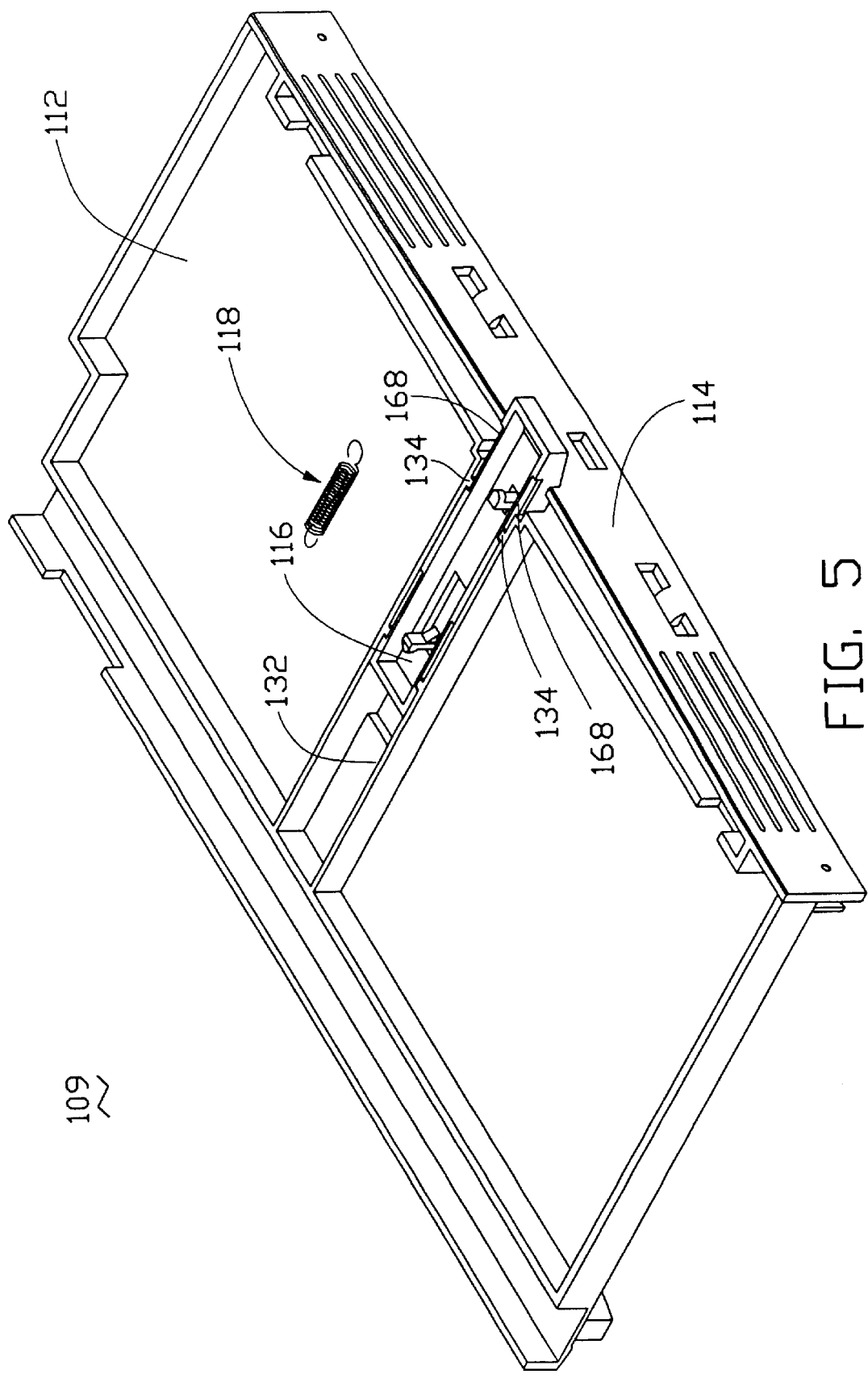
Figure 6:
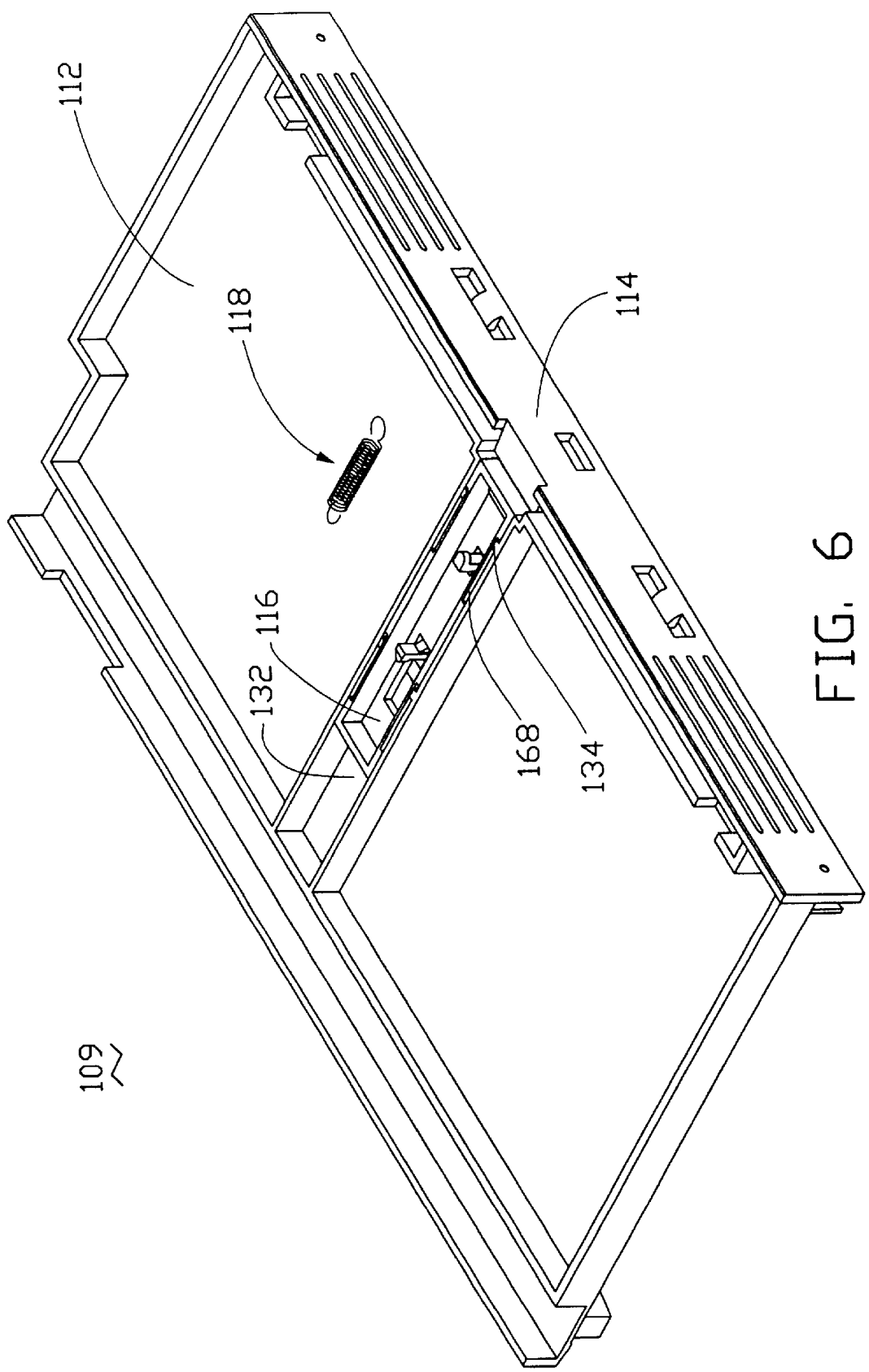

Referring also to FIG. 3, the slider 116 includes a base 148, first and second end walls 150, 154, and a pair of opposite lateral walls 152. A rectangular passageway 158 is defined in the base 148 near the second end wall 154. A pin 160 extends upwardly from the base 148 near the first end wall 150. A head (not labeled) extends perpendicularly from a top of the pin 160, toward the first end wall 150. A reinforcing rib (not labeled) is formed between the base 148 and a bottom portion of the pin 160. The base 148 bends slightly upwardly near the first end wall 150 to form a slanted portion 162. A pair of guiding grooves 164 is defined in outer surfaces of each of the lateral walls 152. Each guiding groove 164 includes a vertical first cavity 166, and a horizontal upper second cavity 168 in communication with the first cavity 166. A handle 170 depends from the second end wall 154.

Referring to FIGS. 4~7, in pre-assembly, ends of the resilient plate 114 are attached to the extension portions 122 of the body 112 by conventional means. The slider 116 is inserted into the channel 132 of the body 112. The handle 170 of the slider 116 extends through the cutout 138 of the body 112 and projects beyond a bottom surface of the body 112. The post 136 of the body 112 extends through the passageway 158 of the slider 116 and projects up from the base 148 of the slider 116. The bosses 134 of the beams 130 enter the first cavities 166 of the guiding grooves 164 of the slider 116. The slanted portion 162 of the slider 116 opposes a top surface of the wedge 140 of the resilient plate 114.

Figure 7:
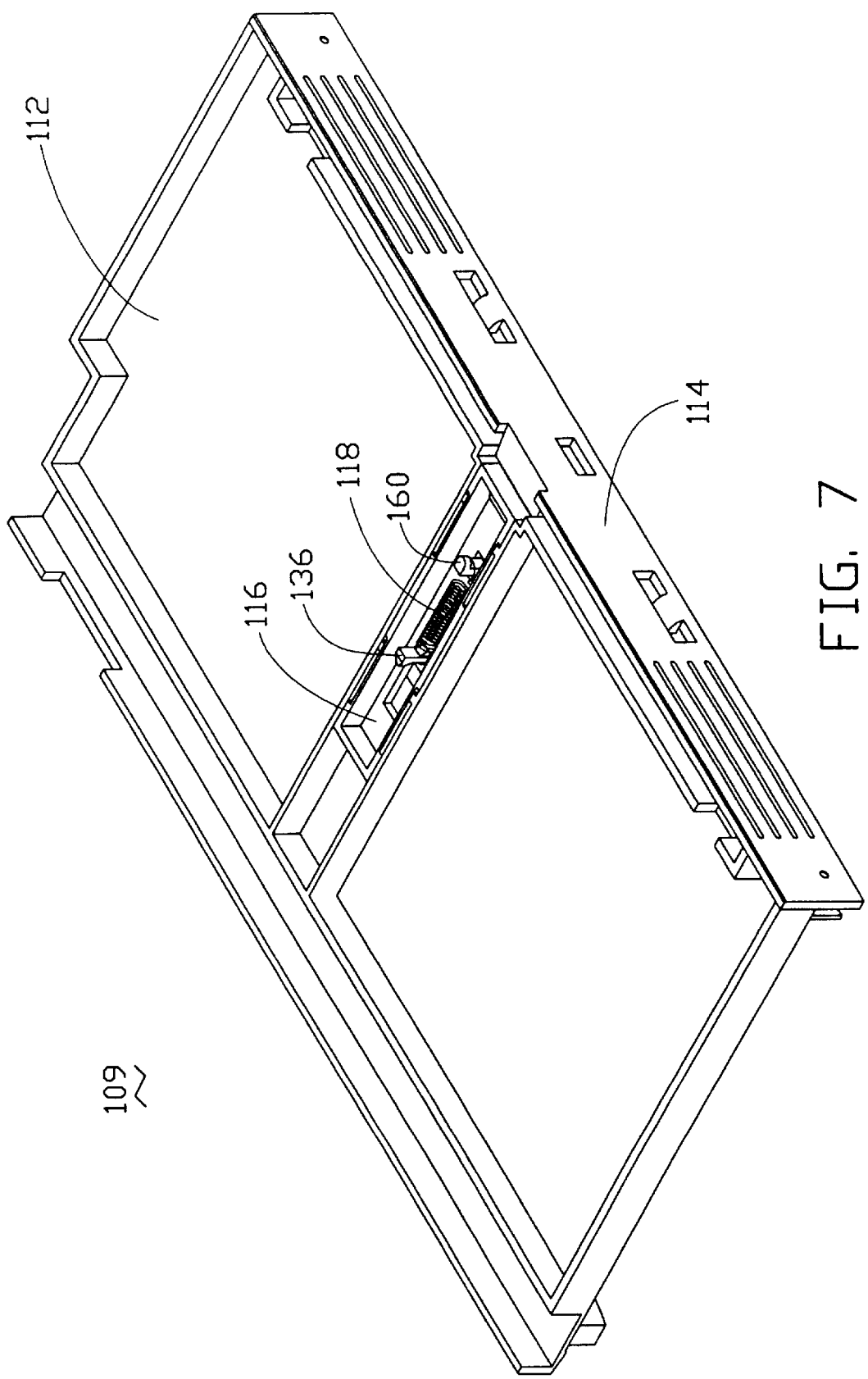

The slider 116 is depressed, thereby causing the bosses 134 to travel along the first cavities 166 until they reach the second cavities 168. The slanted portion 162 of the slider 116 presses the wedge 140 of the resilient plate 114, thereby elastically deforming a middle portion of the resilient plate 114 downwardly (see FIG. 5). Then the handle 170 of the slider 116 is pushed away from the resilient plate 114, thereby causing the bosses 134 to travel along the entire length of the second cavities 168. The post 136 of the body 112 reaches the inmost extremity of the passageway 158 of the slider 116. The slanted portion 162 of the slider 116 no longer touches the wedge 140 of the resilient plate 114 (see FIG. 6). Ends of the spring 118 are clasped around the post 136 of the body 112 and the pin 160 of the slider 116 respectively. The elastic force of the spring 118 maintains the slider 116 in a locking position as shown in FIG. 7. Finally, the fastener 109 is mounted to the bottom surface of the top panel 100 of the cage 10 by conventional means.

Figure 8:
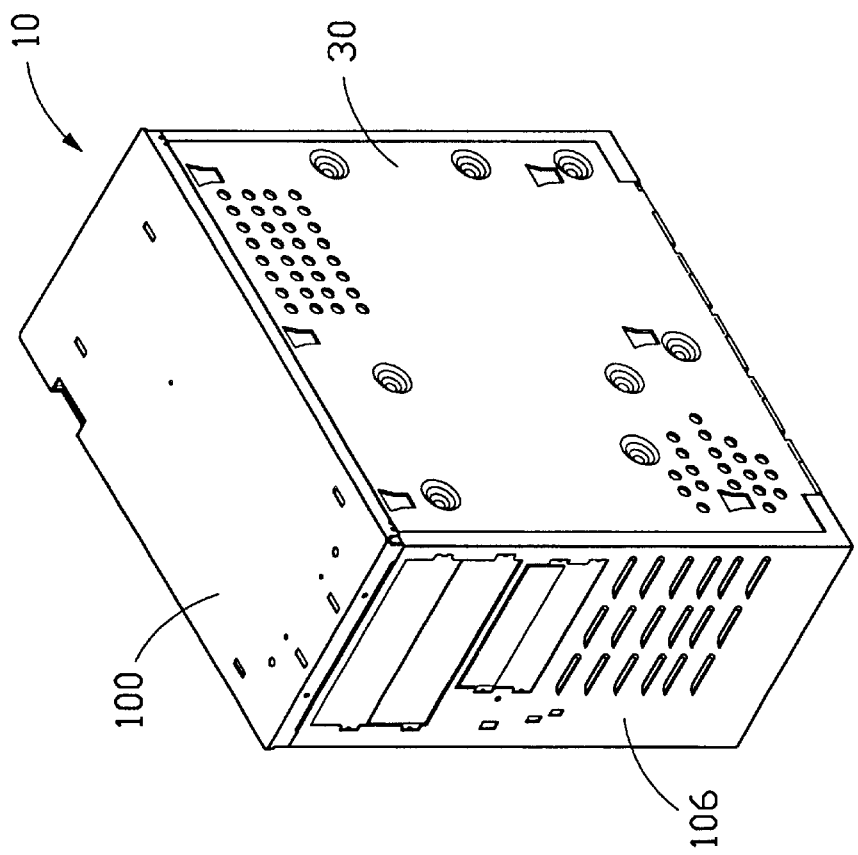
FIG. 8 is an assembled view of FIG. 1.

In assembly of the computer casing, the two pivoting sheets 40 are connected together. The second side panel 30 is rotated until the catches 300 thereof enter the holes 174 of the cage 10 and the apertures 144 of the resilient plate 114. The stops 128 of the body 112 prevent the resilient plate 114 from moving toward the body 112. Thus when the second side panel 30 is further rotated, the catches 300 thereof elastically depress the unciform tabs 146 of the resilient plate 114 to fully enter the apertures 144 of the resilient plate 114 and the slots 126 of the body 12. The slits 302 of the catches 300 thereupon engage with the unciform tabs 146 of the resilient plate 114. Simultaneously, the latch 304 of the second side panel 30 enters the orifice 172 of the cage 10, and the nub 306 of the latch 304 engages with the foramen 142 of the resilient plate 114. Thus the second side panel 30 is readily and firmly attached to the cage 10. Then the clasps 200 of the first side panel 20 are slid into the notches 110 of the cage 10. The clasps 200 are moved horizontally toward the front panel 106 to ensure that they are fully engaged by the notches 110. Thus the first side panel 20 is readily and firmly attached to the cage 10. A final assembled view is shown in FIG. 8.

In disassembly, the recess 202 of the first side panel 20 is held, and the first side panel 20 is moved toward the rear panel 102. This releases the clasps 200 of the first side panel 20 from the notches 10 of the cage 10. The first side panel 20 is then easily removed from the cage 10. Then the handle 170 of the slider 116 is pushed toward the second side panel 30, thereby causing the slanted portion 162 of the slider 116 to depress the wedge 140 of the resilient plate 114. At this stage, the slider 116 is in a releasing position. The middle of the resilient plate 114 is thereby elastically deformed downwardly. This causes the slits 302 of the catches 300 and the nub 306 of the latch 304 to disengage from the unciform tabs 146 and the foramen 142 respectively. The second side panel 30 is then easily removed from the cage 10.

The present invention prevents the second side panel 30 from being accidentally removed first. The second side panel is detachable only by pressing of the handle 170. The handle 170 is accessible only after the first side panel 20 has been removed. Therefore only the first side panel 20 can be removed first. Thus when the second side panel 30 has a mainboard mounted thereto, the present invention prevents the mainboard and inner electronic devices from being damaged by accidental removal of the second side panel 30.

It is understood that the invention may be embodied in other forms without departing from the spirit thereof. Thus, the present example and embodiment are to be considered in all respects illustrative and not restrictive, and the invention is not to be limited to the details given herein.

What is claimed is:

1. A computer casing comprising:
   a panel;
   a fastener mounted to the panel, the fastener having a body, a resilient plate attached to the body, and a slider movably attached to the body, when the slider is moved along the body from a first position to a second position, the resilient plate is elastically deformed; and
   a side panel connected to the panel, when the slider locates at the first position, the side panel engages with the resilient plate, when the slider is moved to the second position, the side panel is disengaged from the resilient plate.

2. The computer casing as described in claim 1, wherein two beams forms a channel therebetween for movably receiving the slider.

3. The computer casing as described in claim 1, the two beams adjacent the channel of the body form at least one pair of opposing bosses, and two lateral walls of the slider define at least one pair of guiding grooves for slidably engaging with the bosses.

4. The computer casing as described in claim 1, wherein the body of the fastener defines a cutout at the channel thereof, and a handle is formed at an end wall of the slider for passing through the cutout and protruding below the body.

5. The computer casing as described in claim 1, wherein the fastener further comprises an elastic member to connect the body and the slider.

6. The computer casing as described in claim 1, wherein another end of the slider forms a slanted portion for engaging with a wedge of the resilient plate.

7. The computer casing as described in claim 1, wherein an indentation is defined in one side wall of the body, for movably receiving the wedge of the resilient plate.

8. The computer casing as described in claim l, wherein the side panel is adapted for mounting of a mainboard thereto.

9. The computer casing as described in claim 3, wherein each guiding groove comprises a first vertical cavity and a second horizontal upper cavity.

10. The computer casing as described in claim 5, wherein a post extends upwardly from the body of the fastener into the channel of the body, a pin extends upwardly from a base of the slider, and a passageway is defined through the base of the slider, and wherein the post extends through the passageway and protrudes into the channel thereby enabling the elastic member to engage with both the post of the body and the pin of the slider.

11. The computer casing as described in claim 7, wherein the side wall of the body defines at least one slot, and at least one stop is formed on the sidewall for abutting the resilient plate.

12. The computer casing as described in claim 11, wherein at least one hole is defined in a side of the panel, at least one aperture is defined in the resilient plate, and at least one unciform tab is formed at each aperture, and wherein the at least one hole and the at least one aperture are both in alignment with the at least one slot of the body.

13. The computer casing as described in claim 12, wherein one end of the side panel forms at least one catch having a slit defined therein, for engaging with the at least one unciform tab of the at least one aperture of resilient plate.

14. A computer casing assembly comprising:
a first panel;
a second panel attached to a first side of said first panel and being perpendicular to said first panel when assembled; and
a third panel attached to a second side of said first panel oppositely parallel to said second panel, and being perpendicular to said first panel when assembled, said third panel being closer, than the second panel, to a main board positioned in a space defined among the first, second and third panel; wherein
the second panel is attached to the first panel in a linear direction, while the third panel is attached to the first panel via rotation about a bottom portion of the third panel and by a fastener located under the first panel, and once assembled, the third panel can be detached from the first panel only by operating said fastener from the first side of the first panel.

15. The casing assembly as described in claim 14, wherein said fastener includes a body attached to the first panel, a resilient plate engageable with the third panel, a slider moveable to actuate the resilient plate to move for either engagement or disengagement with the third panel.

16. The casing assembly as described in claim 15, wherein said slider is moveable along a direction perpendicular to a longitudinal direction of the first panel.

17. The casing assembly as described in claim 15, wherein a spring is provided to hold the slider in position for maintaining the resilient plate engaged with the third panel.

18. The casing assembly as described in claim 15, wherein said resilient plate is deflectable in a direction perpendicular to said first panel.

19. A method for assembling/disassembling a casing of a computer, the steps comprising:
providing a top panel;
attaching a fastener to an underside of the top panel, said fastener including a resilient plate and slider;
linearly attaching a second panel to a first side of the top;
rotatably attaching a third panel to a second side of the top panel and latchably engaged with the resilient plate; wherein
said resilient plate is operably deflectable by movement of the slider for disengaging the third panel therefrom under disassembling.

20. The method as described in claim 19, wherein a direction of movement of the slider is perpendicular to that of deflection of the resilient plate.

* * * * *